Aug. 17, 1937.  J. A. McNATT  2,089,978
MACHINE FOR MAKING FERTILIZER FROM GARBAGE
Filed Nov. 6, 1934  4 Sheets-Sheet 1
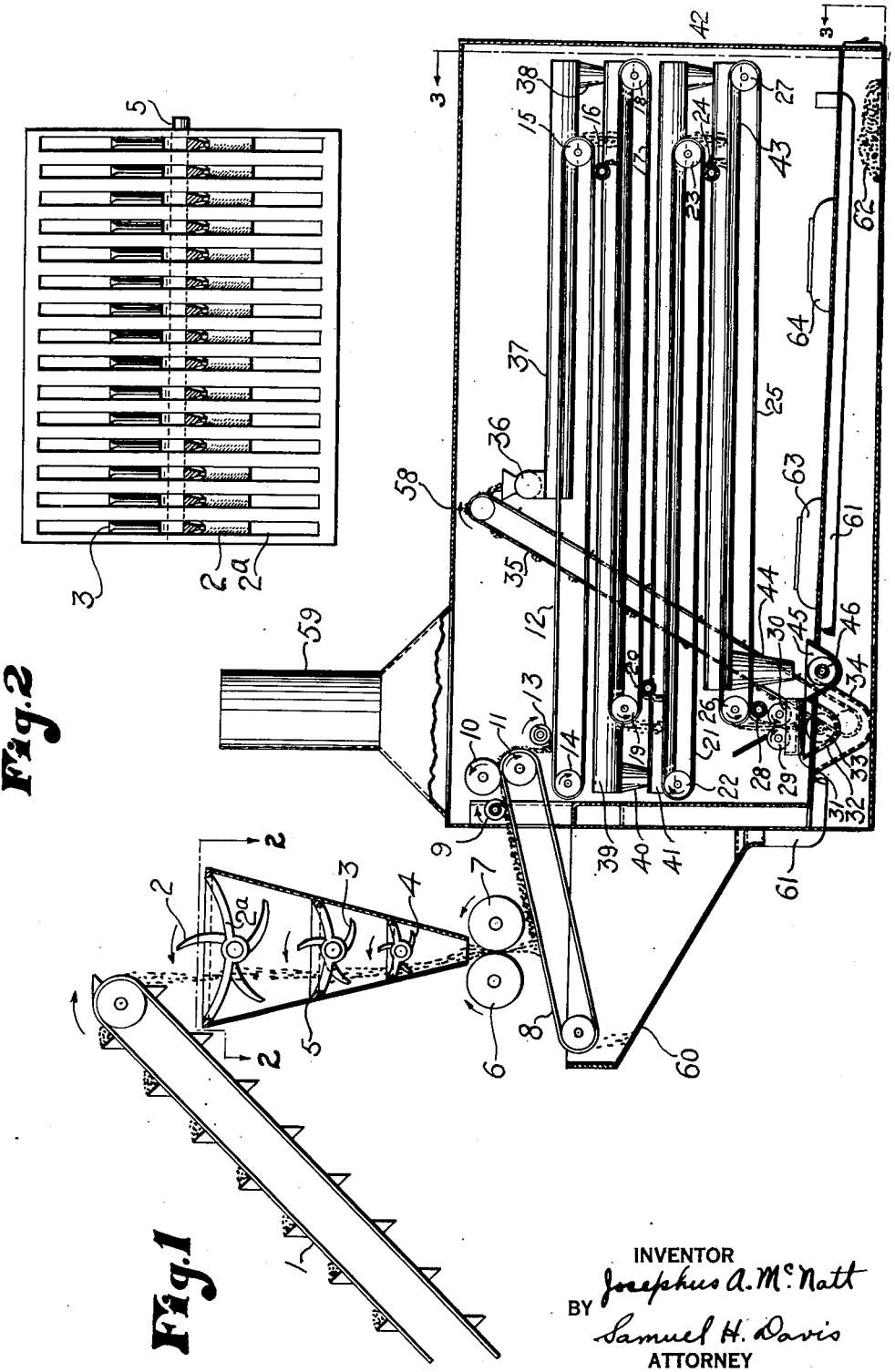
INVENTOR
Josephus A. McNatt
BY Samuel H. Davis
ATTORNEY

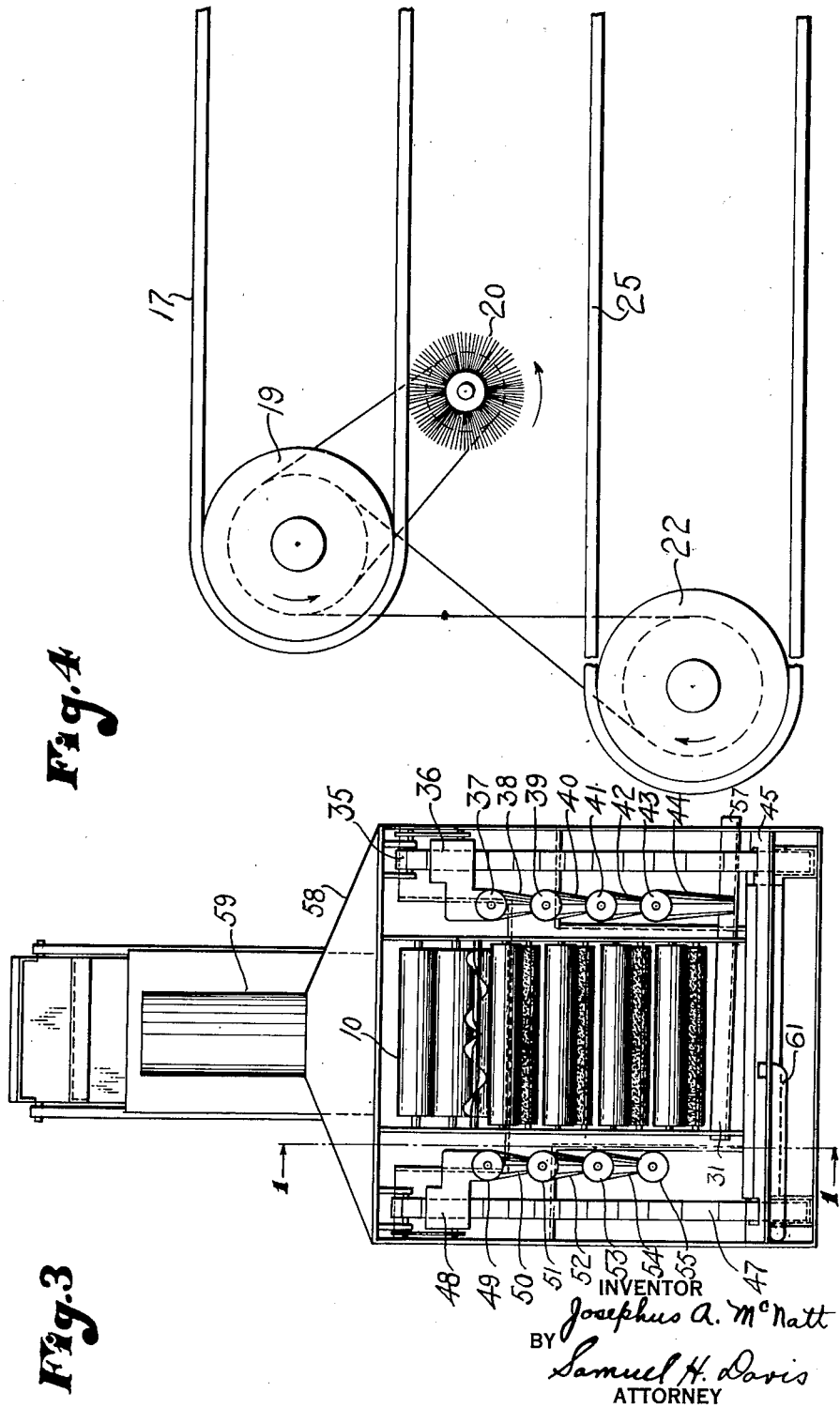

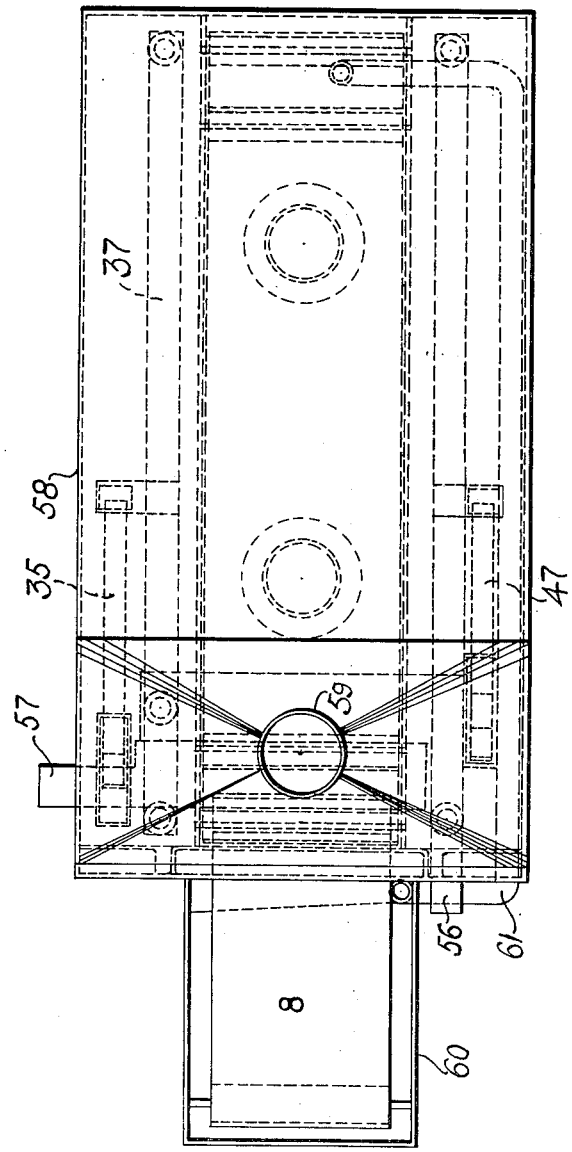

Aug. 17, 1937.　　　J. A. McNATT　　　2,089,978
MACHINE FOR MAKING FERTILIZER FROM GARBAGE
Filed Nov. 6, 1934　　　4 Sheets-Sheet 4
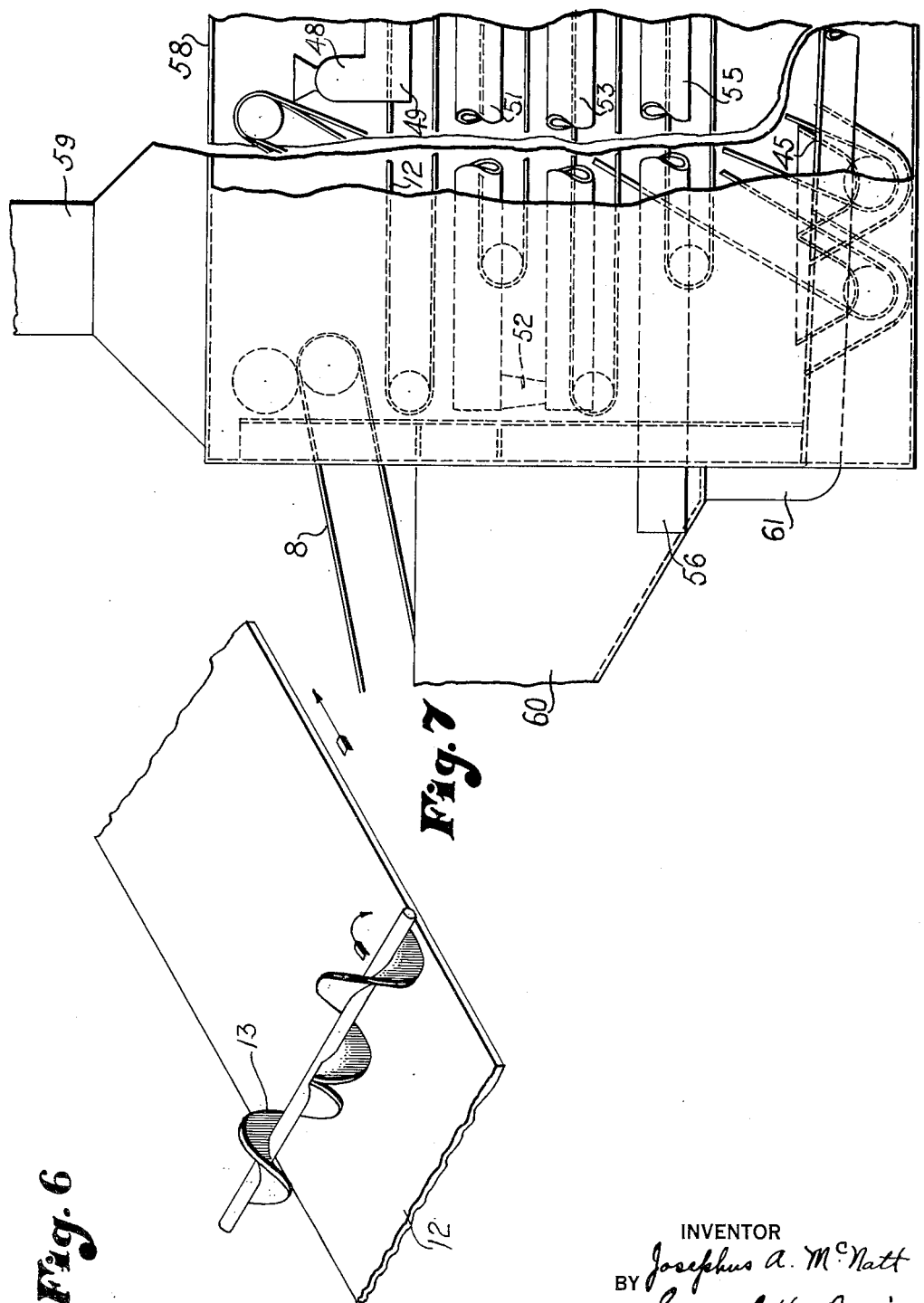
INVENTOR
Josephus A. McNatt
BY Samuel H. Davis
ATTORNEY Patented Aug. 17, 1937

2,089,978

UNITED STATES PATENT OFFICE 2,089,978

MACHINE FOR MAKING FERTILIZER FROM GARBAGE

Josephus A. McNatt, Lansing, Mich.

Application November 6, 1934, Serial No. 751,757

2 Claims. (Cl. 34—12)

This invention relates to machines and methods for making fertilizer from garbage. It is intended to handle all kinds of garbage as well as dead animals such as dogs and cats and any sort of small bodies that may be collected by the scavenger system of a city. The collected material is ground to a pulp and spread evenly over the carriers in a thin layer in order to dry quickly. It is also constantly agitated as it falls from one carrier to another thus making it dry more quickly and throughout. However, at this stage the garbage would still be lumpy and not entirely dry inside, so in this invention it is caused to pass through two grinders at separated intervals for the purpose of getting the moisture completely out of it by the time it gets through the machine. By means of the machine and process hereinafter described the raw garbage is turned into a fine meal-like substance which has chemical elements in sufficient quantities to make it a fertilizer in itself for certain uses, and it further constitutes a base to which other elements may be added to compound a perfect fertilizer that can be used for any purposes. A machine constructed in accordance with this invention is automatic in operation, very economical as to fuel and labor, and there is no objectionable odor in the process.

To make a commercial success of reducing garbage to fertilizer, the design of the machine must be such that it will first grind or cut the garbage to the smallest particles practicable, in order that they may be exposed to heat. Such particles must then be subjected to pressure in order to take as much water or fluid matter as possible out of the ground garbage before it enters the drying chamber, and upon entering the drying chamber the material must be spread to a thin even thickness over the traveling carriers in order that the heat may pass up through and around each particle. Provision must likewise be made to stir or agitate the particles of garbage as they move along, and there must be a sufficient number of carriers to accommodate the quantity of garbage and so move it along that the entire mass will receive the benefit of the heat in the hottest part of the drying chamber at different times in the process of drying, until the particles have become dry and shell-like on the outside. Then, in order to get the garbage all prepared through one machine and have a fine commerical product, means must be provided to grind or crush the dry shell-like particles to a smaller size, and to keep them moving in the drying chamber until they are substantially pulverized and free from moisture. To do this to the best advantage a fire must be kept in the bottom of the drying chamber in order that the heat may rise naturaly or be blown up through the moving particles of garbage and out by way of a small ventilator or stack on the top of the drying chamber or casing sufficient to permit the escape of the excess moisture arising from the garbage in vapor due to the heat.

It is believed that with a machine of the construction of this invention with thirty carrier belts, and by placing the dehydrated residue of one pound of raw garbage upon one square foot of space of the belts, and filling one belt per minute, it would be practicable to run through forty-five hundred pounds of raw garbage in thirty minutes, or four and one-half tons of garbage per hour. The machine need be only twelve feet square, and of sufficient height to accommodate the necessary machinery. This would produce approximately one ton of fertilizer per hour. In operation the machine is entirely automatic, and it is held to be within the purview of this invention to control the heat either by means of a thermostat or by hand.

In the accompanying drawings are illustrated the special structural parts of this invention, and their combination and arrangement.

Fig. 1 represents a vertical section lengthwise through the complete machine, showing all parts assembled.

Fig. 2 is a top plan view of the pyramid hopper and cutters.

Fig. 3 is a vertical cross section of the machine.

Fig. 4 is an enlarged diagrammatic view of the belts or carriers with a brushing device for clearing the belt of particles. The connections for driving the belts and brush are shown in this view.

Fig. 5 is a top plan view taken from above the complete machine.

Fig. 6 shows one form of spreader upon a belt.

Fig. 7 represents a portion of the side and end of the machine which receives the garbage, parts being broken away to disclose the tubular drying conveyors and their arrangement.

Throughout the drawings and description the same number is used to refer to the same part.

Considering the drawings, an upwardly inclined conveyor 1 delivers raw garbage into a pyramid hopper. A series of curved rotating cutters 2, 3 and 4 are placed in the hopper 5, and the cutters are of different size as shown and are supported in slotted cutter plates such as 2a. From the small end of the hopper the garbage is received by the crushing and squeezing rolls 6 and 7 and delivered upon the upwardly inclined belt conveyor 8. As the material is carried upwardly by the belt it is evenly and thinly spread thereon by the spreader 9 and passes between additional pressing and crushing rolls 10 and 11 to be deposited upon an open-work carrier or conveyor 12 whereon it is spread by the spreader 13. It will be understood that each open-work conveyor is suitably borne upon end rollers such as rollers 14 and 15, and that each conveyor may be provided with a spreader such as spreader 13, and a clearing brush such as the brush 16 to detach any adhering particles. From the upper conveyor 12 the material drops upon the second and like conveyor 17 carried on rollers 18 and 19 and having the clearing brush 20. The next lower conveyor is marked 21, on rollers 22 and 23, and provided with the clearing brush 24. It will be noted that the depositing end of one conveyor is arranged somewhat short of the end of the next lower conveyor in order that the stuff may drop from one conveyor upon the next. The lower open-work conveyor 25 is carried upon rollers 26 and 27 and has the clearing brush 28. The mechanical means for driving the conveyors is not shown, but any ordinary motor means of well known construction may be introduced to run the machine. From the end of lowest conveyor 25 the material drops in a comparatively dry condition upon crushing rolls 29 and 30 whereby it is crushed into fine particles sufficiently small to pass through a sieve or screen 31. This sieve cleans out all metal pieces or uncrushed bodies that are too large to pass the sieve, and it is usual in practice to provide the screen with a screw conveyor by means of which the unscreened lumps may be discharged outside the machine casing. The sifted garbage drops into the trough 32 and by means of the screw conveyor 33 is transferred to the side of the machine and into a hopper 34, from which the material is raised by an elevating conveyor 35. From the elevating conveyor the material passes directly into a grinder 36, and thence to the uppermost tubular conveyor 37 on the same side of the machine. Spout or funnel 38 delivers the material to the next tube or trough conveyor 39, which in turn passes the garbage through funnel 40 into conveyor 41. Thence the practically fine and dry stuff passes by the funnel 42 into the lowest tube or trough conveyor 43. By way of the funnel 44 the material falls into a trough 45 and by means of a screw conveyor 46 it is transferred to the opposite side of the machine. Here a second elevating conveyor 47 carries the material again to the top of the machine and delivers it to a second grinding device 48, shown in Fig. 3. The drying conveyors on this side may be of like construction to those mentioned as located on the other side, and from the grinder 48 the now prepared stuff passes through conveyor 49, funnel 50, conveyor 51, funnel 52, conveyor 53, funnel 54, into the lowest of the drying conveyors on this side marked 55. This conveyor extends to the outside and the end thereof is marked 56 in Fig. 7. The completed fertilizer may thus be delivered into any suitable storage or shipping receptacles.

In this invention it is intended to include the right to introduce any number of open-work conveyors, and any number of side tubular or trough conveyors, and to actuate them by any usual power contrivances.

In Fig. 3 the number 57 refers to the end of the sieve trough by which the oversize and unsifted particles are discharged from the casing or chamber of the machine. Any desired form may be given the casing 58 and stack 59.

Again considering Fig. 1, when the cut garbage is squeezed between rolls 6 and 7 fluid matter mostly water drops on the belt 8 and runs down into the receiver 60, and from thence the water is led into the casing by the pipe 61, and vaporized by the fire or heater 62. Electric blowers 63 and 64 send the heated air upwardly through and around the various conveying and drying contrivances. The purpose of returning the fluids from receiver 60 by pipe 61 into the back and bottom of the casing 58 as shown in Fig. 2, is to dispose of the fluids. The heat vaporizes the fluids at the back of the casing and the vapor passes upwardly above the conveyors and out of the stack. Any solid particles from the vaporized fluid drops upon the upper conveyor 12.

The operation is as previously detailed. The raw garbage is cut up, the moisture is squeezed out, the material is spread out thin, subjected to heat, screened, and passed through as many drying members as may be desired and of any selected formation and arrangement to produce fine, dry, deodorized fertilizer.

I claim as my invention and desire to protect by patent:—.

1. In a machine for making fertilizer from garbage, in combination, means for receiving, cutting and for squeezing the garbage, a casing adjacent to said means and provided with a heater and an outlet stack, a fluid receiver located at one end of the casing below said squeezing means, a conveyor having one end adjacent to the top of the receiver of fluid and the other end entering the upper part of said casing, said conveyor being constructed and arranged to take garbage from said squeezing means and to conduct solid particles into the casing and to allow fluids to fall into said receiver, a series of open-work conveyors in said casing provided with crushing devices and adapted to conduct the garbage from said entering conveyor to the lower part of the casing, screening means for extracting uncrushed larger particles, mechanism for discharging the screened out bodies from the casing, conveying means for moving the screened garbage to the side of the casing, an elevating conveyor therefor, a series of side drying conveyors constructed and arranged to conduct the garbage from the upper to the lower part of the casing at the side of the casing, conveying means for moving the garbage to the opposite side of the casing, a second elevating conveyor, a second side series of drying conveyors, and means for delivering the ground and dried garbage from the lower part of said second series of side conveyors to the exterior of said casing.

2. In a machine for making fertilizer from garbage, in combination, means for receiving, cutting and for squeezing the garbage, a casing adjacent to said means and provided with a heater and an outlet stack, a fluid receiver located at one end of the casing below said squeezing means, a conveyor having one end adjacent to the top of the fluid receiver and the other end entering the upper part of said casing, said conveyor being constructed and arranged to take garbage from said squeezing means and to conduct solid particles into the casing and to allow fluid to fall into said receiver, a series of open-work conveyors in said casing provided with crushing devices and adapted to conduct the garbage from said entering conveyor to the lower part of the casing, screening means for extracting uncrushed larger particles, mechanism for discharging screened out bodies from the casing, conveying means for moving the screened garbage to the side of the casing, an elevating conveyor therefor, a series of side drying conveyors constructed and arranged to conduct the garbage from the upper to the lower part of the casing at the side of the casing, conveying means for moving the garbage to the opposite side of the casing, a second elevating conveyor, a second side series of drying conveyors, means for delivering the ground and dried garbage from the lower part of said second series of side conveyors to the exterior of said casing, and a conduit from said fluid receiver to said heater whereby fluid is vaporized and discharged through said stack.

JOSEPHUS A. McNATT.